United States Patent
Jong et al.

(10) Patent No.: US 10,658,928 B2
(45) Date of Patent: May 19, 2020

(54) SWITCHED CAPACITOR CONVERTERS WITH MULTI RESONANT FREQUENCIES

(71) Applicant: Virginia Tech Intellectual Properties, Inc., Blacksburg, VA (US)

(72) Inventors: Owen Jong, Blacksburg, VA (US); Qiang Li, Blacksburg, VA (US); Fred C. Lee, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 16/372,101

(22) Filed: Apr. 1, 2019

(65) Prior Publication Data

US 2019/0334434 A1    Oct. 31, 2019

Related U.S. Application Data (60) Provisional application No. 62/662,963, filed on Apr. 26, 2018.

(51) Int. Cl.
*G05F 1/10*    (2006.01)
*H02M 3/07*    (2006.01)

(52) U.S. Cl.
CPC ...... *H02M 3/073* (2013.01); *H02M 2003/077* (2013.01)

(58) Field of Classification Search
CPC .. H02M 3/156; H02M 3/1588; H02M 3/1584; H02M 3/158; Y02B 70/1466
USPC .............. 327/536; 323/282; 363/59–60
See application file for complete search history.

(56) References Cited

U.S. PATENT DOCUMENTS 9,350,242 B2 * 5/2016 Lee ................. H02M 3/07
2004/0141345 A1 * 7/2004 Cheng ............ H02M 3/1582
363/127

OTHER PUBLICATIONS

Shoyama, M., et al., "Resonant switched capacitor converter with high efficiency", (Nov. 2004) IEEE 35th Annual Power Electronics Conference (IEEE Cat. No. 04CH37551), pp. 3780-3786.
Xu, Ming, et al., "Voltage divider and its application in the two-stage power architecture", (Apr. 2006) Twenty-First Annual IEEE Applied Power Electronics Conference and Exposition (DOI: 10.1109/APEC.2006.1620584), pp. 7.
Li, Y., et al., "A high efficiency resonant switched-capacitor converter for data center", (Nov. 2017) IEEE Energy Conversion Congress and Exposition (ECCE), pp. 4460-4466.

* cited by examiner

*Primary Examiner* — Anh Q Tra
(74) *Attorney, Agent, or Firm* — Thomas Horstemeyer, LLP (57) ABSTRACT

Various examples are provided related to switched-capacitor converters (SCCs) with multi resonant frequencies. In one example, a multi resonant SCC (MRSCC) includes a series of switches coupled between an input voltage and an output connection; a pair of diodes coupled across the output connection; and a resonant circuit coupled at a first end between first and second switches of the series of switches and at a second end between the pair of diodes. The resonant circuit can comprise a resonant tank including a first capacitor and a resonant inductor, and a resonant component in parallel with at least a portion of the resonant tank. The resonant component can be connected across the resonant tank or across the resonant inductor. The MRSCC topology can also be used with higher voltage conversion ratio converters.

16 Claims, 10 Drawing Sheets

SWITCHED CAPACITOR CONVERTERS WITH MULTI RESONANT FREQUENCIES

CROSS-REFERENCE TO RELATED APPLICATIONS

This application claims the benefit of and priority to U.S. Provisional Patent Application No. 62/662,963, filed on Apr. 26, 2018, entitled "SWITCHED-CAPACITOR CONVERTERS WITH MULTI-RESONANT FREQUENCIES.

BACKGROUND

In high-power applications of a switched-capacitor divider circuit, the dominant loss is its conduction loss. Conventional switched-capacitor converters (SCCs) have an inherent drawback that their efficiency is significantly decreased as the output current is increased due to its periodic forced charging and discharging operation in the internal switched-capacitors accompanied by a large capacitor current. The current can be reduced by increasing the internal resistance of the switches. As a result, the output power is limited to a very small output current.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Disclosed herein are various examples related to switched-capacitor converters (SCCs) with multi resonant frequencies. Reference will now be made in detail to the description of the embodiments as illustrated in the drawings, wherein like reference numbers indicate like parts throughout the several views.

In order to reduce the conduction loss in a switched-capacitor circuit, the RMS current of the power devices can be reduced by adding a resonant component to the circuit. By operating the switched-capacitor circuit switching frequency at its resonant frequency, not only can it achieve zero current switching on all switches, but to can also reduce the RMS current of the switches close to 1.11 of its average current. However, when the switching frequency is not exactly at the resonant frequency, the conduction loss will increase due to its body diode conduction. Hence, a smart controller is needed to ensure zero current switching to achieve the benefits of a resonant switched-capacitor due to tolerance.

In this disclosure, a second resonant component can be added in switched-capacitor divider circuit to further increase the efficiency while reducing the tolerance effect. A small capacitor can be placed in parallel to the resonant inductor to provide a current path when the switches are open, hence the current will not freewheel through the body diode. By introducing this second resonant, the RMS current on the switches can be further reduced to its average current by reshaping the current close to a square wave.

Figure 1A:
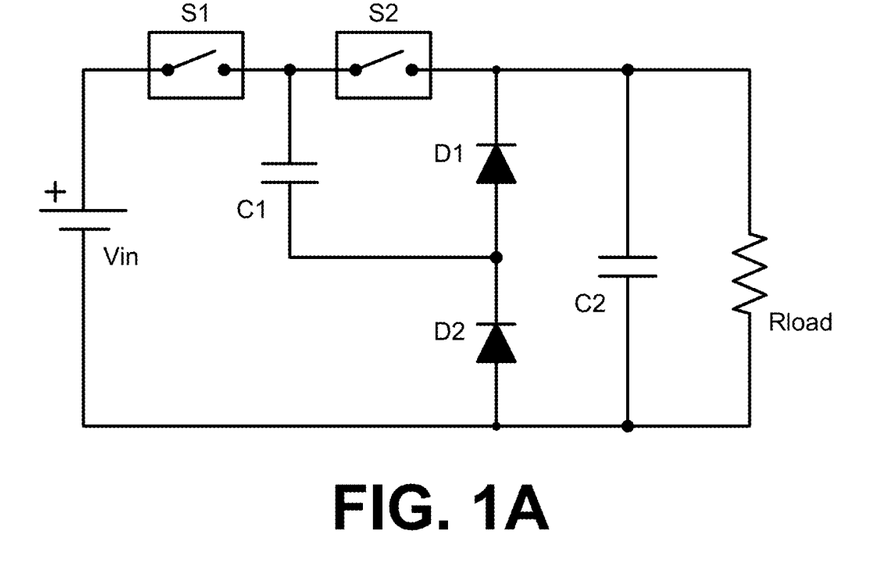
FIG. 1A is a schematic diagram illustrating an example of a switched-capacitor converter (SCC), in accordance with various embodiments of the present disclosure.
Figure 1B:
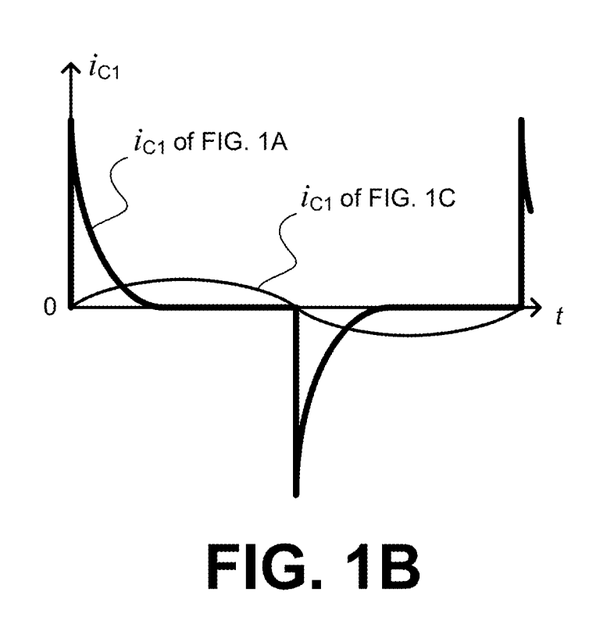
FIG. 1B is a plot illustrating capacitor current ($i_{C1}$) in the SCC of FIG. 1A and the resonant SCC of FIG. 1C, in accordance with various embodiments of the present disclosure.

Referring to FIG. 1A, shown is a schematic diagram illustrating an example of a SCC circuit topology of a half buck type converter in a 2 to 1 (2:1) configuration. In this topology, every time switches S1 and S2 (e.g., switching devices Q1 and Q2) alternately turn on/off, a large pulse current flows through capacitors C1 and C2 by the forced charging and discharging operations. FIG. 1B illustrates the current ($i_{C1}$) through capacitor C1 over one switching period for the SCC topology of FIG. 1A. This large pulse current brings about a power loss due to the internal resistance, such as the conduction resistance, of the switches S1 and S2. This power loss cannot be decreased even when the internal resistance is reduced, because the pulse current is increased with the reduction in the internal resistance.

Figure 1C:
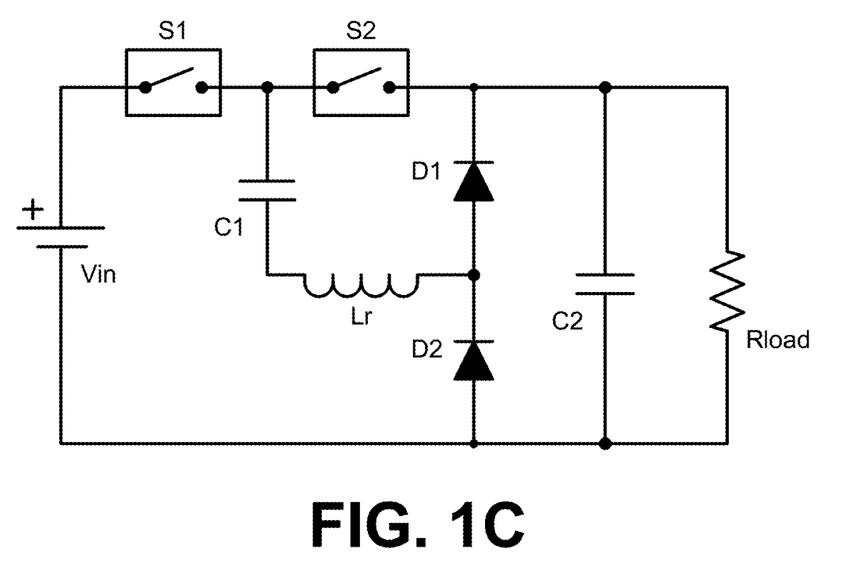
FIG. 1C is a schematic diagram illustrating an example of a resonant SCC, in accordance with various embodiments of the present disclosure.

Referring next to FIG. 1C, shown is a schematic diagram illustrating an example of a resonant SCC circuit topology (2:1) of a half buck type converter. In this example, a small inductor Lr has been added in series with the capacitor C1 to remove the large pulse current illustrated in FIG. 1B. In this case, the capacitor C1 operates as a resonant capacitor and capacitor C2 is an output capacitor that is assumed to be very large with respect to C1 (C1<<C2). The two active switches S1 and S2 are driven alternately with a 50% duty ratio. Diodes D1 and D2 can be replaced by synchronous switches to eliminate the diode conduction loss to increase the efficiency.

Due to the resonant inductor Lr, the charging and discharging current ($i_{C1}$) of capacitor C1 becomes sinusoidal as illustrated in FIG. 1B. In this case, high efficiency can be obtained when the internal resistance is reduced. Under the assumption that C1<<C2, the switching frequency ($f_s$) can be set to meet the relationship given by:

$$f_S = \frac{1}{2\pi\sqrt{L_r C_1}} \tag{1}$$

In the SCC of FIG. 1A, the average current of capacitor C2 is zero. Thus, the output current has to be equal to the sum of the currents of C2 and D1. The current of capacitor C1 can be rectified by switch S2 and diode D1 as the DC output current. Therefore:

$$|I_{C1}|_{ave} = I_0 \tag{2}$$

Due to the charge balance of C1, the positive area of the current of C1 should be equal to its negative area. With equation (2), the average amplitude of either the positive or the negative current pulse should be $I_0$. This property persists in resonant versions of SCC.

The RMS value of the sinusoidal current waveform is known to be $I_{pk}/\sqrt{2}$ and its average for half a period is $2I_{pk}/\pi$. Using these two properties and equation (2), the $I_{C1_{RMS}}$ of the resonant SCC of FIG. 1C will be limited to:

$$I_{C1_{RMS}} = \frac{I_0 \pi}{2\sqrt{2}} = 1.111 I_0 \tag{3}$$

This resonant concept can be extended to higher voltage conversion ratio (VCR) topologies such as, e.g., a Dickson SCC in a two stage point of load (POL) application. The input voltage can efficiently be dropped to 6 times lower using a 6:1 Dickson SCC to achieve high efficiency in a second stage buck converter.

Resonant SCC can still exhibit some drawbacks. Due to its nature, when operating at its resonant frequency ($F_0$) the resonant SCC limits its RMS value to be at best 1.111 of its output current. Not only that, but the resonant inductor Lr will see a large core loss due to the fact that its current will swing about 3.14 times of the output current. This value can increase if the switching frequency differs from $F_0$ due to a tolerance issue. This tolerance issue can happen due to variations in component tolerance during implementation. Ceramic capacitors, which are commonly used in POL applications due to their low equivalent series resistance and inductance (ESR and ESL), have a DC bias voltage coefficient on top of its tolerance. The capacitance of a ceramic capacitor will vary depending on its applied DC bias voltage. Hence, in mass production, smart control and/or customized ceramic capacitors are needed to achieve zero current operation in order to gain the full benefits from a resonant SCC.

Figure 2A:
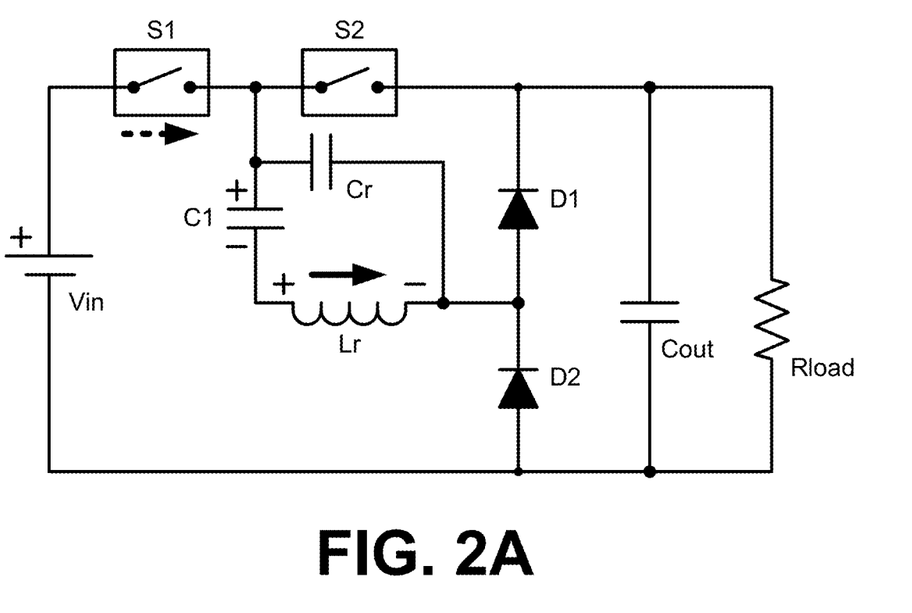
FIGS. 2A and 2B are schematic diagrams illustrating examples of multi resonant switched-capacitor converters (MRSCCs), in accordance with various embodiments of the present disclosure.
Figure 2B:
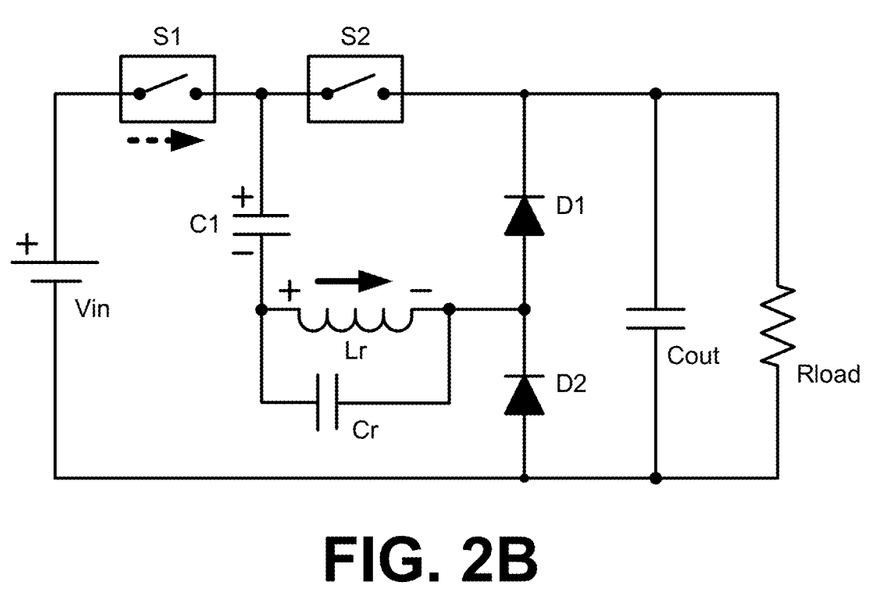

FIGS. 2A and 2B illustrate examples of multi resonant SCCs that can be used to address some of these drawbacks. The disclosed multi-resonant switched-capacitor converters (MRSCCs) introduce a second resonant component in order to reduce the tolerance issue while at the same time offering the flexibility to reduce the RMS current in the main resonant tank. FIGS. 2A and 2B show schematic diagrams of examples of MRSCCs in the 2 to 1 configuration. The resonant capacitor Cr introduces the second resonant component during the dead-time between the switching of S1 and S2. The second resonant component reverses the inductor current during the dead-time so the main resonant tank could deliver the energy without charging its inductor from zero every half cycle.

FIG. 2A shows a MRSCC (2:1) with the resonant capacitor Cr in a parallel to tank including C1 and Lr, and FIG. 2B shows a MRSCC (2:1) with Cr in parallel with the resonant inductor Lr. The working principles of the MRSCCs of FIGS. 2A and 2B are the same, but by having the resonant capacitor Cr in parallel with the resonant inductor Lr, the DC bias voltage of the MRSCC of FIG. 2B will be zero. This can be preferable since the capacitance value varies only due to its tolerance.

Figure 3A:
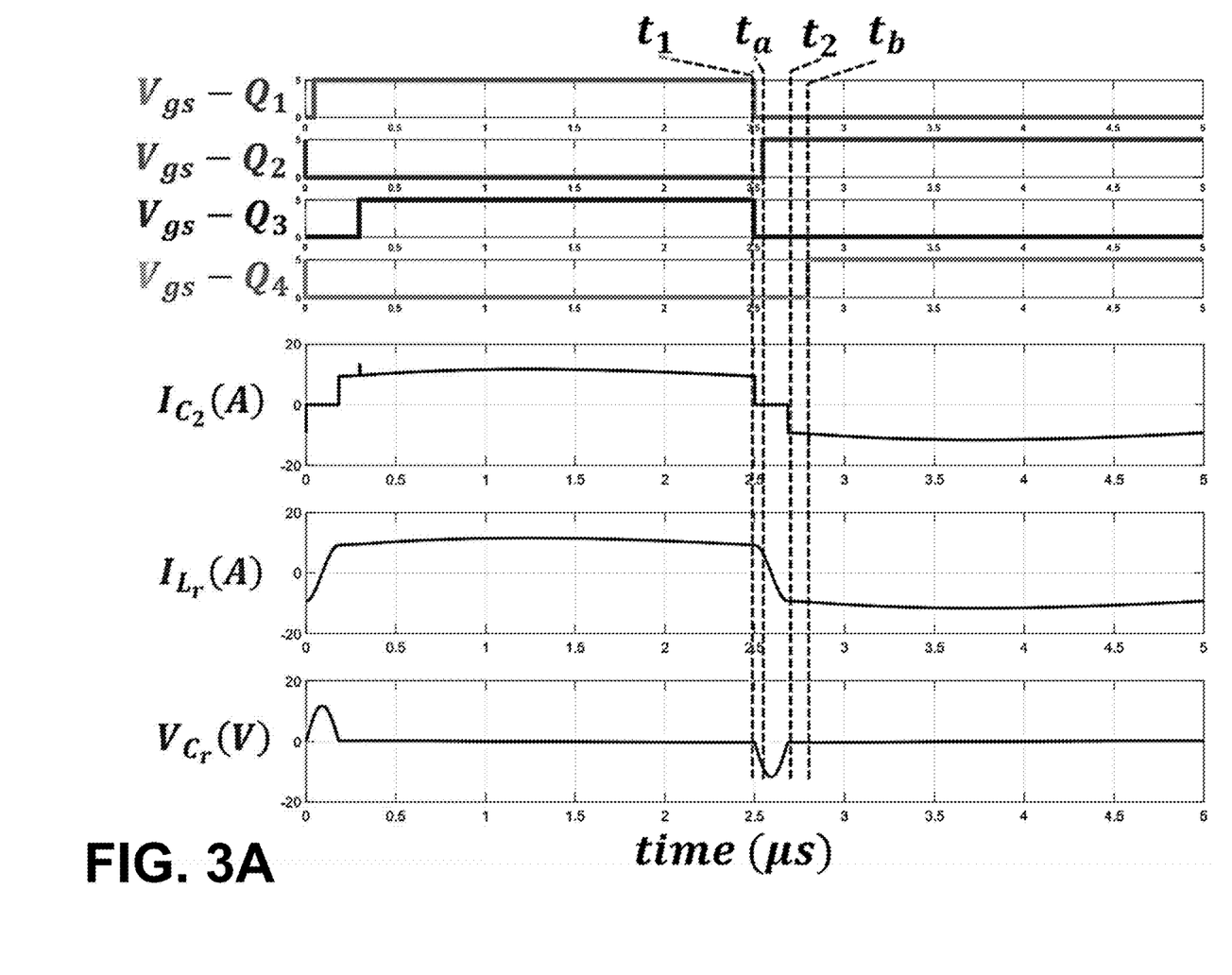
FIGS. 3A and 3B illustrate the switching signal, current and voltage during operation of a MRSCC, in accordance with various embodiments of the present disclosure.
Figure 3B:
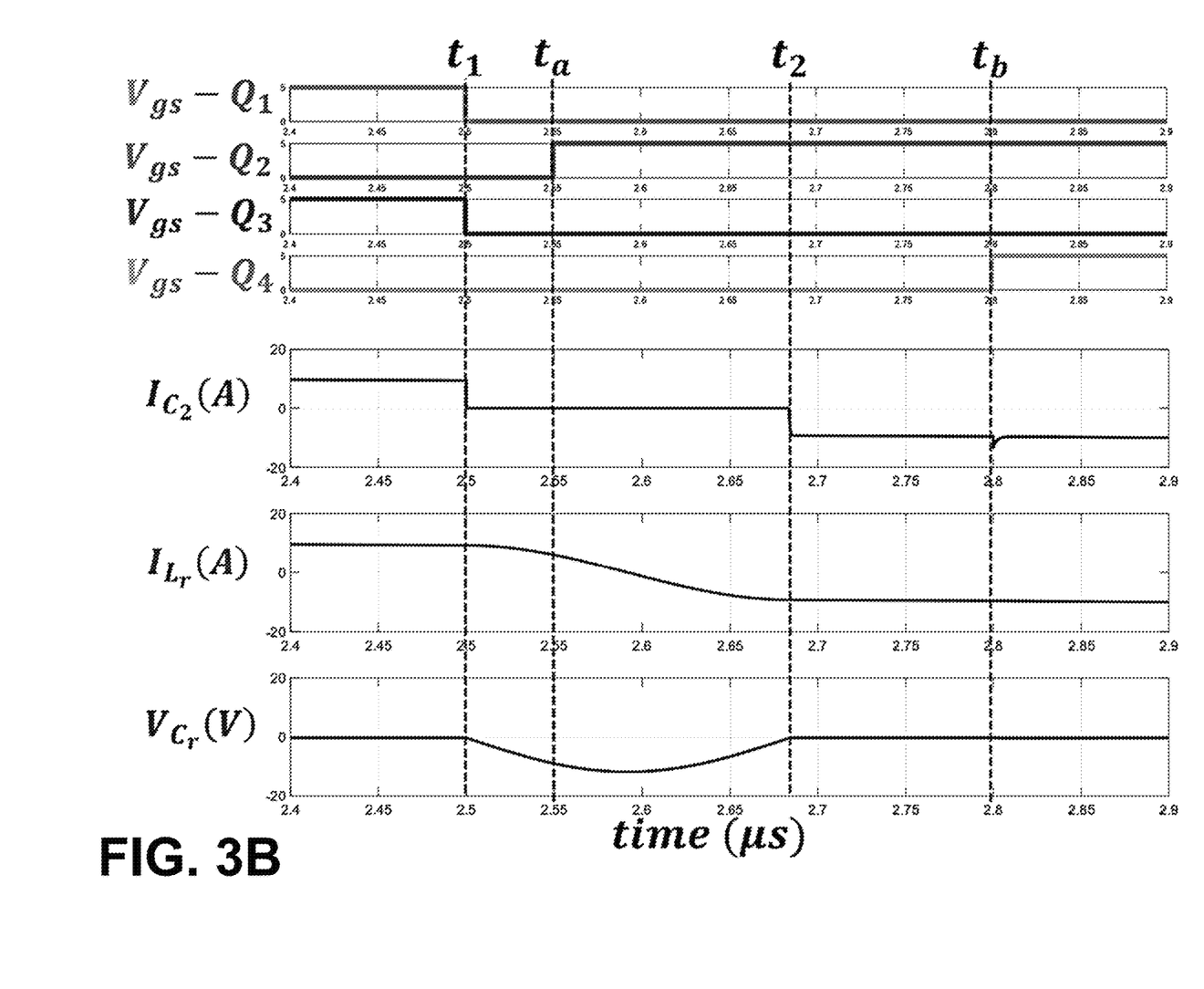

FIGS. 3A and 3B illustrate the operation of the MRSCC of FIG. 2A over two switching periods. The four different areas shown in FIGS. 3A and 3B depict the four state of operations of MRSCC. The first area of the waveform shows the first state when the current conducts from the input voltage to the output through the switch 1 (S1) and the main resonant tank (C1 and Lr). The beginning of the second state happens after switch S1 turns off and the second resonant tank (Lr and Cr) takes over. The resonant capacitor Cr was added to provide current path for Lr to resonate when there is some residue current once the S1 is open. This new current path prevents the inductor current going through the body diodes of the switches and at the same time utilizing the dead time to reverse the inductor current through Lr using second resonant tank before the next state. Hence, by the time the third state starts, switch 2 (S2) turns on, the main resonant tank is ready to deliver current to the output (doesn't start from zero), however, the main resonant tank will not deliver energy if the second resonant is not over yet as shown in FIG. 3. The resonant tank will not be able to deliver energy as long as the sum of the voltage of C1 and Lr is below the output voltage (½ Vin).

Figure 4:
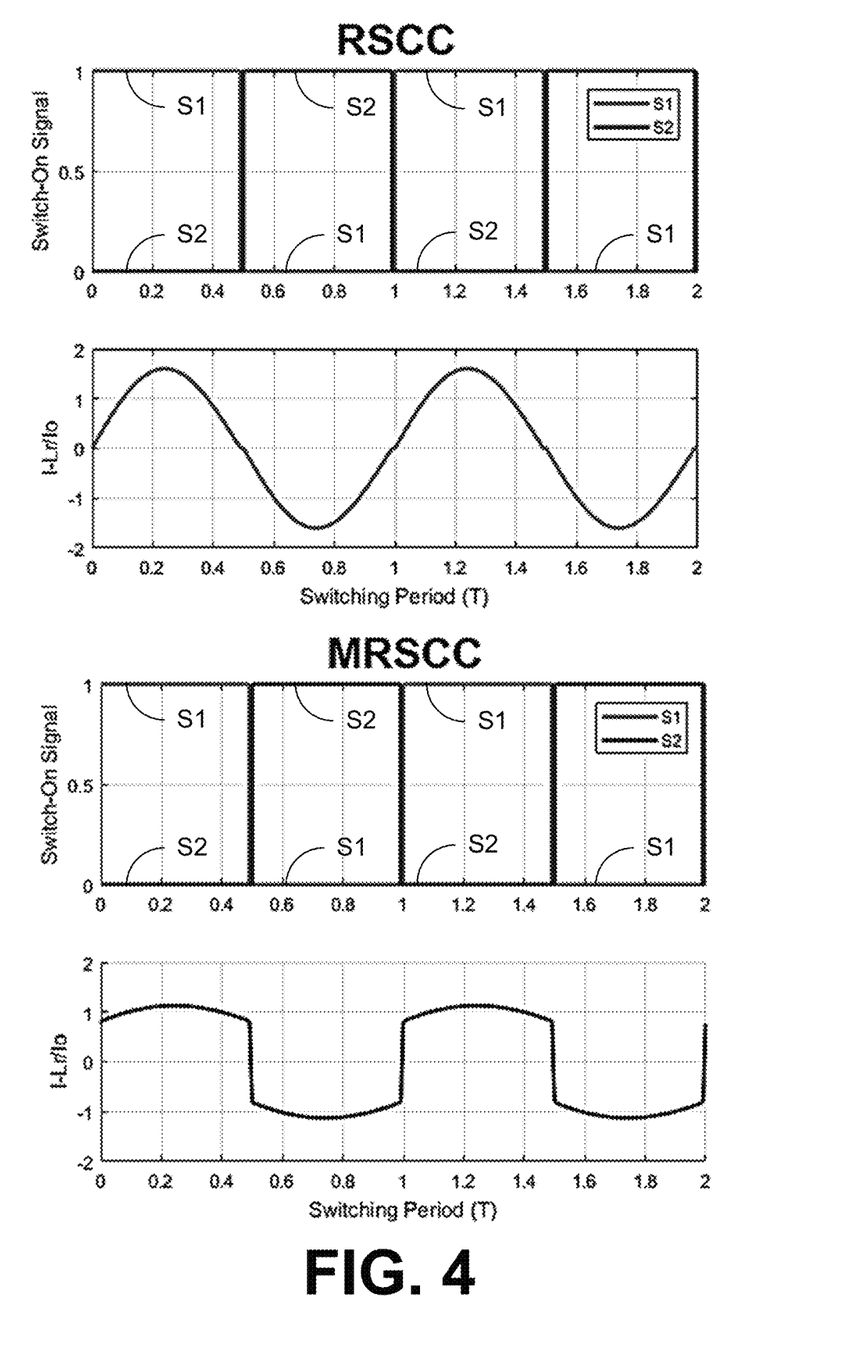
FIG. 4 illustrates a comparison of the inductor current for a MRSCC and a resonant SCC half buck converter, in accordance with various embodiments of the present disclosure.

By introducing the second resonant component with the inductor Lr, the ability to reshape the inductor current to be closer to a square wave can be obtained by reducing the resonant frequency of the main resonant tank (Lr and C1). By having a square wave inductor current, it is possible to reduce two type of losses: conduction loss and inductor core loss. When the inductor current is a square wave, its RMS current will be its output current. Moreover, by having lower peak to peak value, the system's overall loss can be reduced by having lower core loss. FIG. 4 shows the simulated inductor current in MRSCC in comparison to the simulated inductor current in the resonant SCC for a buck type converter. The simulation for the MRSCC was done with tje resonant frequency ($F_0$) being half of its switching frequency. It shows that the MRSCC reduces the peak to peak value of the inductor current and maximizes the on time to deliver energy to the output, resulting in the current being close to square wave in shape.

Figure 5:
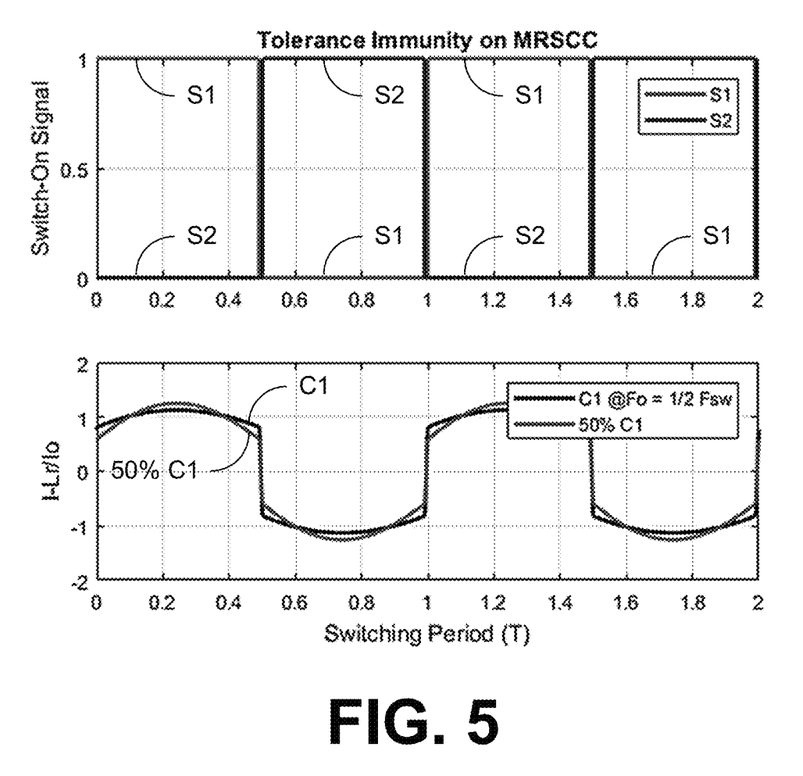
FIG. 5 illustrates the tolerance immunity of a 4 to 1 (4:1) Dickson MRSCC topology, in accordance with various embodiments of the present disclosure.

FIG. 5 illustrates the tolerance immunity of a 4 to 1 (4:1) Dickson MRSCC topology with the option to short the anode of D1 and D5. By operating the switching frequency higher than the main resonant tank frequency, the MRSCC becomes immune to component tolerance and ceramic capacitor voltage coefficient issues. FIG. 5 shows two different simulations done with the same switching frequency. The ideal condition of the simulation was when $F_0$ is set to be 50% of $F_{SW}$. The second condition is when C1 drops to 50% of its initial value. This simulated voltage coefficient issues on a ceramic capacitor under the worst condition (it varies more than the tolerance).

Based on the simulation, the RMS value of the inductor current increases from 1.02 of its output current to 1.03 of the output current. The 1% change in the RMS value does not impact the efficiency of MRSCC. The simulation was done at its worst condition, hence the MRSCC has immunity on change due to tolerance and voltage coefficient of the ceramic capacitors. This immunity allows the converter to be designed using cheaper components, such as cheaper dielectric materials capacitors.

The multi resonant topology including the second resonant component can be expanded to higher voltage conversion ratio (VCR) switched-capacitor converters. In general, the second resonant component design is expandable to any SCC where the resonant SCC concept is applicable. While there are a wide range of higher VCR SCC, to illustrate the implementation of the multi resonant configuration this disclosure presents high VCR Dickson buck type topologies for 4 to 1, 6 to 1 and 8 to 1 MRSCCs.

Figure 6:
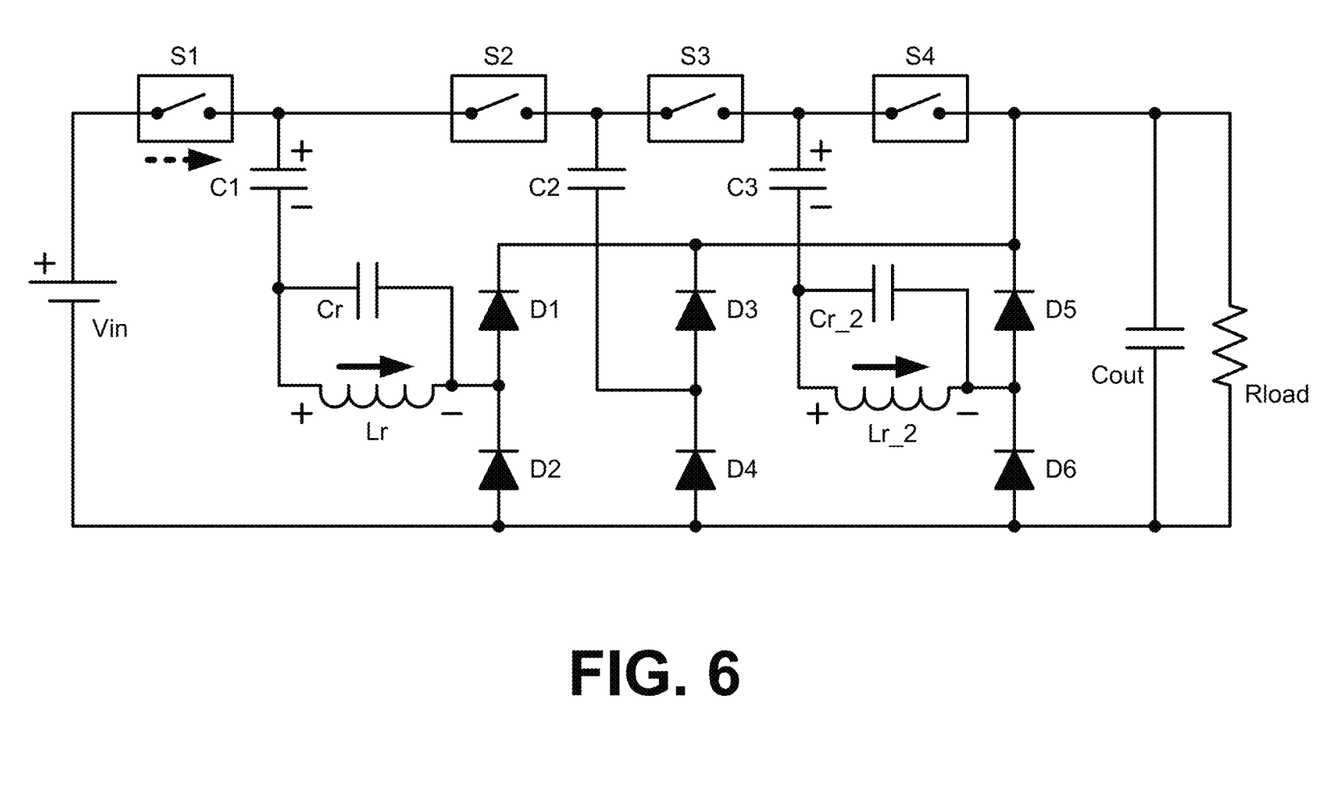
FIG. 6 is a schematic diagram illustrating an example of a 4:1 MRSCC Dickson topology, in accordance with various embodiments of the present disclosure.

Referring to FIG. 6, shown is a schematic diagram of multi resonant configuration in a 4:1 Dickon MRSCC. There are three branches comprising C1, C2 and C3, however only C1 and C3 will be part of the resonant tanks. Capacitor C2, both in the resonant SCC and the MRSCC, has a capacitance value that is much greater than capacitors C1 and C3 (C2>>C1 and C2>>C3) such that it will not affect the resonant frequency of $F_0$. Since there are two branches comprising resonant tanks, to apply MRSCC in this topology, two resonant capacitors (Cr and Cr_2) provided for each resonant inductor (Lr and Lr_2). Due to the nature of the Dickson topology, the anode of diodes D1 and D5 will always be the same voltage. Thus, it is possible to short them together to obtain better performance of the converter. MRSCC is still applicable even with the anodes of D1 and D5 are tied together.

Figure 7:
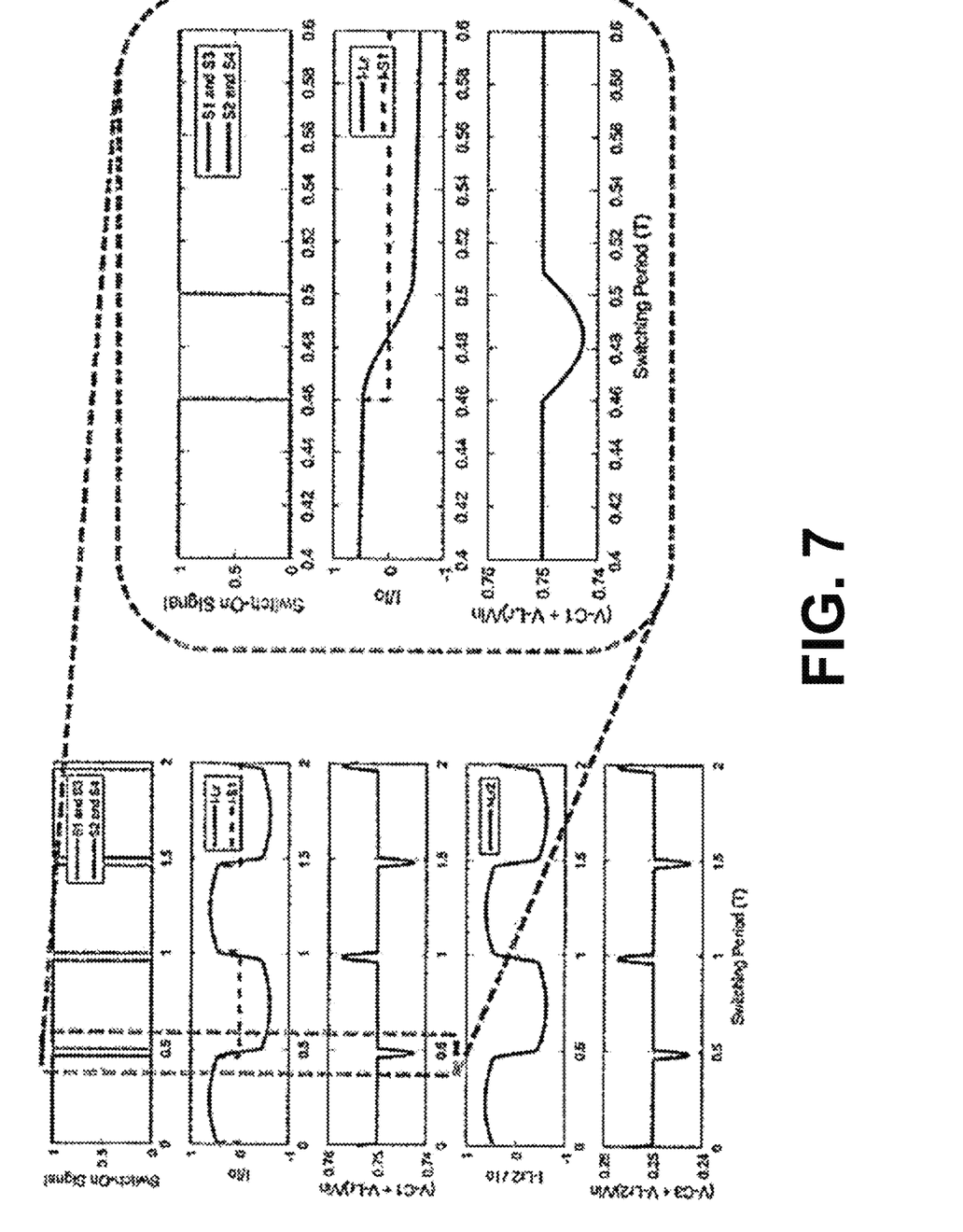
FIG. 7 illustrates the switching signal, current and voltage during operation of the MRSCC Dickson topology of FIG. 6, in accordance with various embodiments of the present disclosure.

The plots of FIG. 7 illustrate the operation of the 4 to 1 Dickson MRS CC topology. It has a very similar characteristic as the half buck type MRSCC shown in FIG. 3. During the dead time, both resonant capacitors Cr and Cr_2 reverse the direction of respective resonant inductor (Lr and Lr_2) current in order to reduce its RMS during energy deliverance to its output. In other words, the capacitors Cr and Cr_2 help to reshape the current waveforms of Lr and Lr_2 to more of a square wave.

Figure 8:
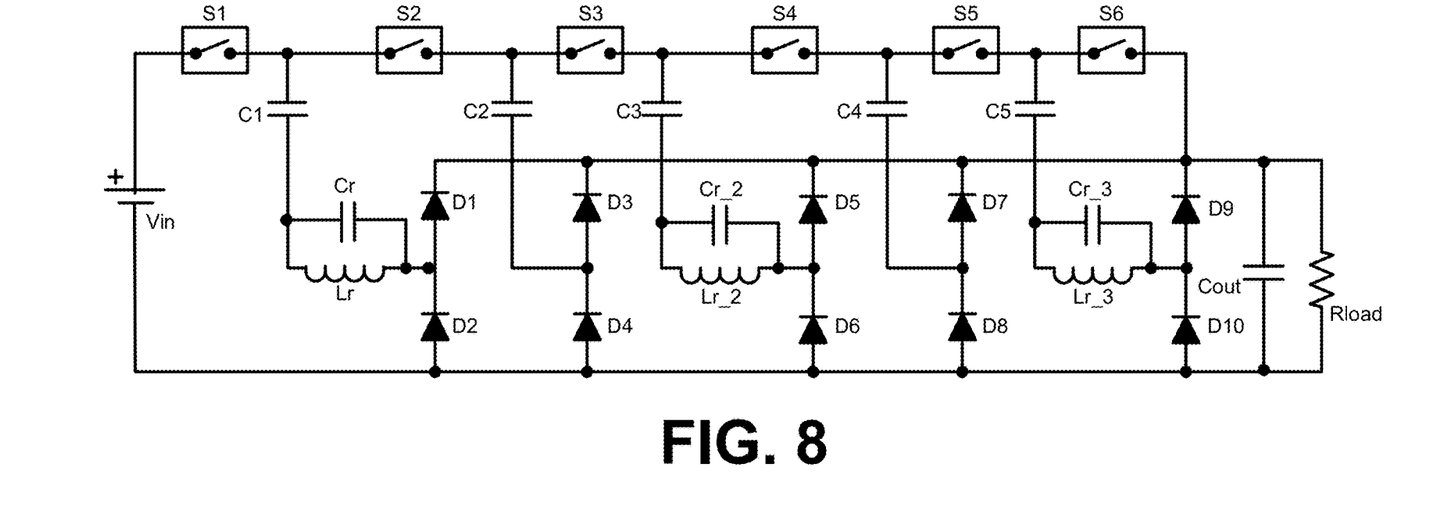
FIGS. 8 and 9 are schematic diagrams illustrating examples of 6 to 1 and 8 to 1 MRSCC Dickson topologies, in accordance with various embodiments of the present disclosure.
Figure 9:
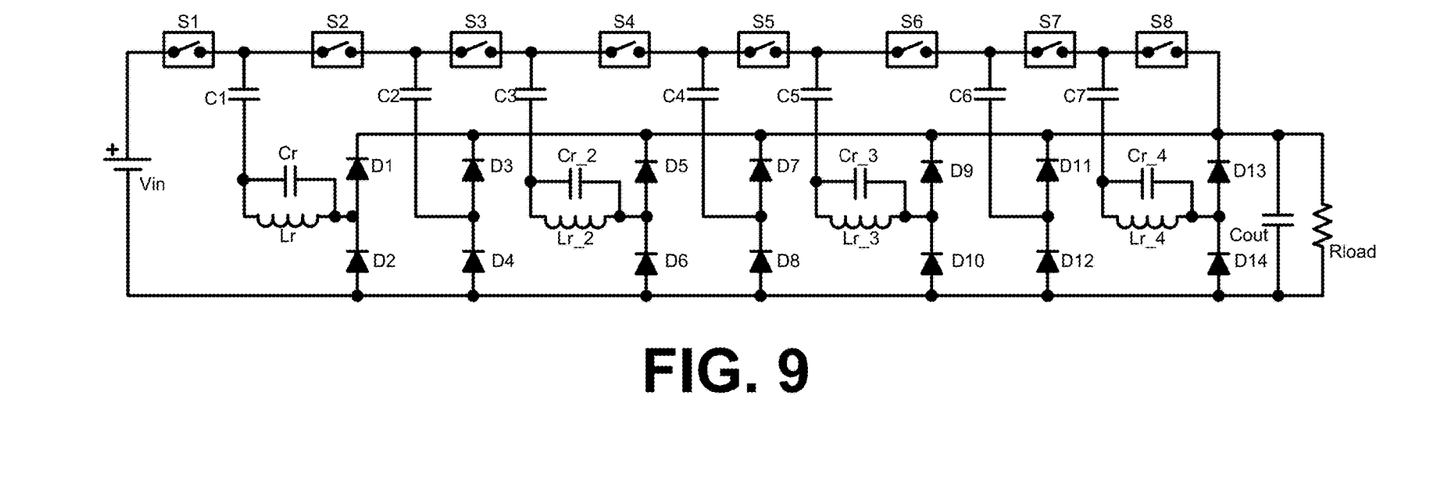

FIG. 8 shows the configuration of a 6 to 1 Dickson MRSCC topology. Similar to the 4 to 1 Dickson MRSCC topology, the anode of diodes D1, D5 and D9 can be tied together, as well as the anode of D3 and D7 as shown in FIG. 8. Similarly, the concept of the 6 to 1 Dickson MRSCC is applicable even when the anodes of D1, D5 and D9 are tied together as well as with those of D3 and D7 tied together. FIG. 9 shows a schematic diagram illustrating how to extend the MRSCC concept to an 8 to 1 Dickson topology to achieve a higher voltage conversion ratio (VCR).

This disclosure has presented a novel multi resonant switched-capacitor converter topology by introducing a second resonant component to the resonant tank circuits. This multi resonant configuration can reduce the peak to peak resonant tank inductor current, hence reduces stress on the magnetic core. It can also reduce the RMS conduction current further in comparison to resonant SCC, hence reduces conduction loss. In addition, this topology can increase immunity to component tolerance, which can allow for the use of poor voltage coefficient ceramic capacitors, and hence can reduce the cost of the solution. The MRSCC topology can be expanded to higher voltage conversion ratio switched-capacitor converters as has been discussed.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A multi resonant switched-capacitor converter (MRSCC), comprising:
   a series of switches coupled between an input voltage and an output connection;
   a pair of diodes coupled across the output connection; and
   a resonant circuit coupled at a first end between first and second switches of the series of switches and at a second end between the pair of diodes, the resonant circuit comprising a resonant tank including a first capacitor and a resonant inductor, and a resonant component in parallel with at least a portion of the resonant tank.

2. The MRSCC of claim 1, wherein the resonant component is a resonant capacitor connected across and in parallel with the resonant tank.

3. The MRSCC of claim 1, wherein the resonant component is a resonant capacitor connected across and in parallel with the resonant inductor.

4. The MRSCC of claim 1, comprising:
   a second pair of diodes coupled across the output connection in parallel with the pair of diodes; and
   a second resonant circuit coupled at a first end between third and fourth switches of the series of switches and at a second end between the second pair of diodes, the second resonant circuit comprising a second resonant tank including a second capacitor and a second resonant inductor, and another resonant component in parallel with at least a portion of the second resonant tank.

5. The MRSCC of claim 4, wherein the other resonant component is a resonant capacitor connected across and in parallel with the second resonant tank.

6. The MRSCC of claim 1, wherein the other resonant component is a resonant capacitor connected across and in parallel with the second resonant inductor.

7. The MRSCC of claim 4, comprising:
   a third pair of diodes coupled across the output connection in parallel with and between the pair of diodes and the second pair of diodes; and a third capacitor coupled at a first end between the second and third switches and at a second end between the third pair of diodes.

8. The MRSCC of claim 7, wherein the capacitance of the third capacitor is greater than the capacitance of the first and second capacitors.

9. The MRSCC of claim 4, comprising:

a third pair of diodes coupled across the output connection in parallel with the pair of diodes and the second pair of diodes; and a third resonant circuit coupled at a first end between fifth and sixth switches of the series of switches and at a second end between the third pair of diodes, the third resonant circuit comprising a third resonant tank including a third capacitor and a third resonant inductor, and an additional resonant component in parallel with at least a portion of the third resonant tank.

10. The MRSCC of claim 9, wherein the additional resonant component is a resonant capacitor connected across and in parallel with the third resonant tank.

11. The MRSCC of claim 9, wherein the additional resonant component is a resonant capacitor connected across and in parallel with the third resonant inductor.

12. The MRSCC of claim 1, comprising an output capacitor coupled across the output connection.

13. The MRSCC of claim 1, wherein a load is connected to the output connection.

14. The MRSCC of claim 1, wherein the MRSCC is a buck converter.

15. The MRSCC of claim 14, wherein the MRSCC is a Dickson MRSCC.

16. The MRSCC of claim 14, wherein the Dickson MRSCC has a higher voltage conversion ratio (VCR) of 4 to 1, 6 to 1 or 8 to 1.

\* \* \* \* \*